Jan. 16, 1923. 1,442,065.
C. B. HARROP.
TUNNEL KILN.
FILED JUNE 11, 1920.

Inventor
Carl B. Harrop
By Edwin F. Corbett
Attorney

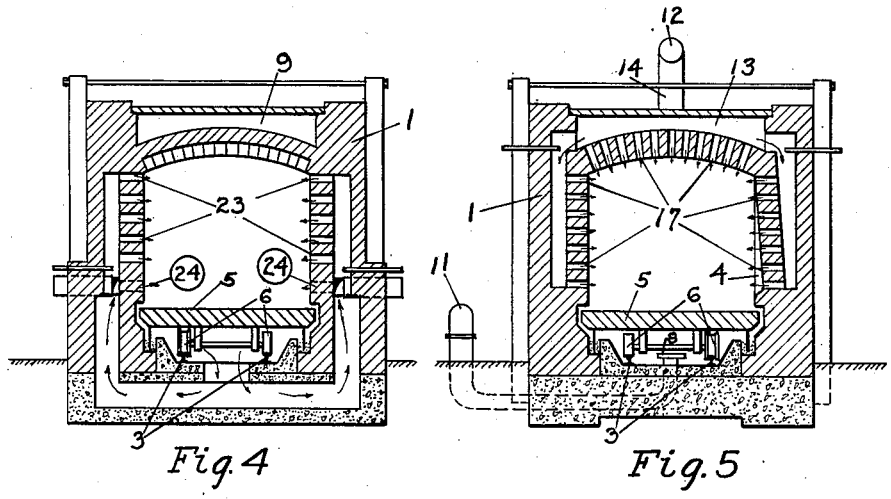
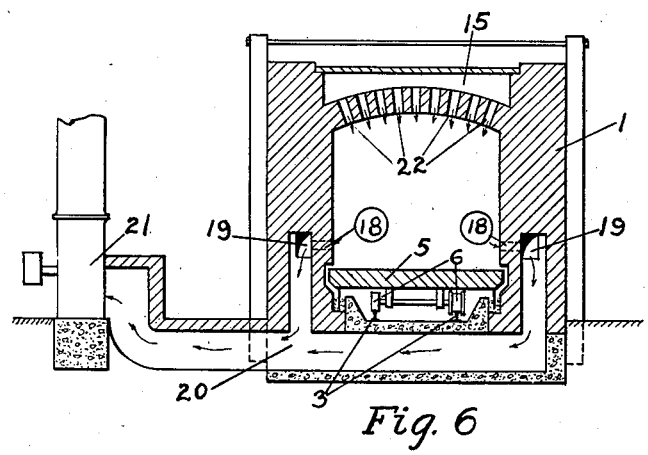

Patented Jan. 16, 1923.

1,442,065

UNITED STATES PATENT OFFICE.

CARL B. HARROP, OF COLUMBUS, OHIO.

TUNNEL KILN.

Application filed June 11, 1920. Serial No. 388,219.

*To all whom it may concern:*

Be it known that I, CARL B. HARROP, a citizen of the United States of America, residing at Columbus, in the county of Franklin and State of Ohio, have invented certain new and useful Improvements in Tunnel Kilns, of which the following is a specification.

My invention relates to tunnel kilns and aims to produce a tunnel kiln in which the several stages of the firing of ware can be as readily and as completely carried out as in the periodic type of kiln, a performance which has not hitherto been accomplished in any other tunnel kiln. My kiln is specially constructed to facilitate the attainment of these results and it is also equipped with a novel structure to facilitate the cooling of the ware so that the time and length of kiln required for annealing the ware is greatly shortened.

In the firing of clay ware in periodic kilns, the different stages of this operation, that is, water-smoking, oxidation and vitrification are all carried on at different or successive periods of time. In the continuous tunnel type of kiln, on the contrary, all three of these operations are being carried on at the same time within the tunnel.

Owing to the fact that these various operations take place at the same time within the tunnel kiln, it has been customary to rely merely upon the gases from the combustion or vitrification zone to not only accomplish vitrification but to effect oxidation and water-smoking as well.

My invention is founded on the realization that the attempt to utilize the gases from the vitrification zone for the oxidation and water-smoking of the ware is radically wrong in principle. From the standpoint of economy and efficiency, there is always an ideal amount of air to be used in firing the ware and it is highly desirable to have a minimum amount of excess air at the firing zone. When this proper amount of air and minimum amount of excess air is utilized, the oxygen passing to the oxidation zone is entirely inadequate to accomplish the oxidation of the ware at the most rapid rate. This retards the rate at which the ware can pass through the kiln and oftentimes prevents a sufficient capacity to warrant the installation of a tunnel kiln. If an attempt is made to increase the output of the kiln by a more rapid rate of movement of the ware it will frequently result in "black coring" or bloating of the ware either in the oxidation zone or more possibly in the vitrification zone.

In addition, the attempt to effect water-smoking by means of the gases from the firing zone usually results in scumming of the ware, due to the sulphur contained in the combustion gases from the firing zone.

My invention consists in the provision of a tunnel kiln which makes possible the treatment of the ware in a tunnel kiln with all the advantages of economy of operation and continuous movement of the ware through the kiln and yet with all the advantages from ability to provide the proper kiln atmosphere for the various stages of firing. It also consists in the provision of certain features not hitherto known to either tunnel kilns or periodic kilns.

In the first place, I have provided a means for introducing air in a heated condition into the oxidation zone without passing it through either the firing zone or the water-smoking zone. Furthermore, I accomplish this by the provision of a chamber starting directly beyond the furnace section and extending along the crown of the kiln and continuing over the oxidation zone. Air is forced along this chamber preferably by means of a blower fan which is connected to said chamber at one end thereof near the furnace section. Intermediate the length of said chamber by which time the air has been sufficiently heated, it is delivered into the oxidation zone.

I have likewise provided a means for introducing fresh and preheated air into the water-smoking zone. This is also accomplished by means of a chamber preferably in the crown of the kiln and within the space between the oxidation zone and the entrance end of the kiln. The air is likewise forced into this chamber by the blower fan but this chamber is entirely separate from the chamber above the oxidation zone.

In addition, I have provided in the kiln a novel method and structure for hastening the cooling of the ware, which makes possible the attainment of a more effective annealing for a given length of time or kiln or a normal annealing action for a shorter length of time or kiln. I accomplish this by the practical application of the recognized and accepted fact that the dropping of the temperature of clay ware through the higher ranges down to 450 or 500 degrees C. with comparative rapidity is permissible without a resultant injury to the ware, although a sudden dropping below this range may be injurious. I have provided a series of valve-controlled inlets preferably in side walls through which is introduced fresh air from beneath the car platforms.

The preferred embodiment of my invention is shown in the accompanying drawings wherein similar characters of reference designate corresponding parts and wherein—

Figure 4 is a section taken on line 4—4 of Figure 2.

Figure 5 is a section taken on line 5—5 of Figure 2.

Figure 6 is a section taken on line 6—6 of Figure 2.

Figure 1:
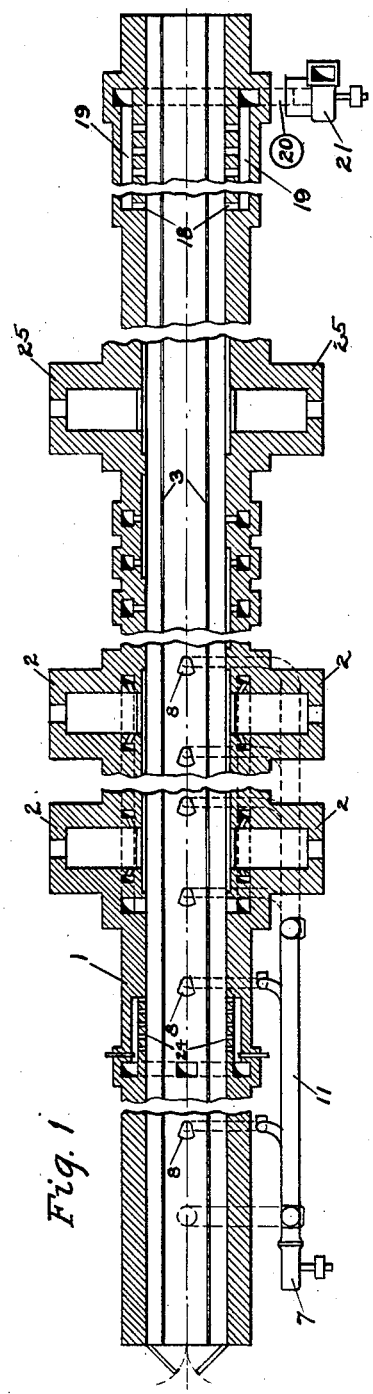
Figure 1 is a plan view partially in section of my tunnel kiln.
Figure 2:
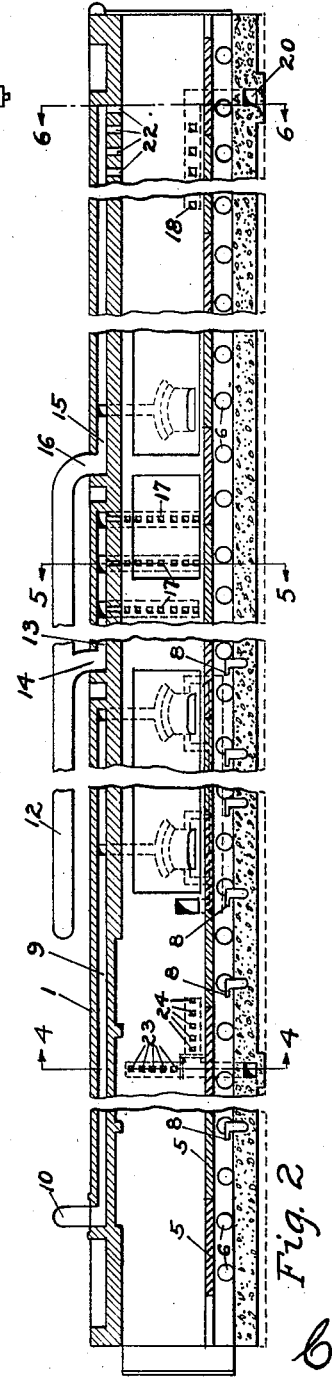
Figure 2 is a vertical longitudinal section of my tunnel kiln.
Figure 3:
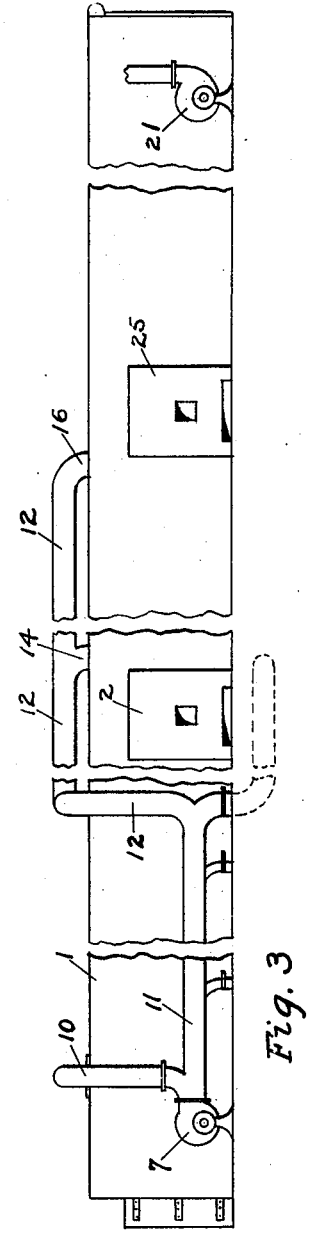
Figure 3 is a detail view illustrating the blower fan which forces air into the various chambers along the top of the kiln.

In the drawings, my invention is shown as comprising a kiln 1, furnaces 2 of a suitable number, a track 3 and walls cut away as at 4. In these cut-away portions 4 fit the edges of the cars 5 whose wheels 6 ride upon the track 3 and whose platforms carry the ware.

In the form shown, air is forced under pressure by means of a blower fan 7 to various points 8 beneath the platforms of the cars. These platforms practically serve to seal the space beneath the car away from the space above the car.

Located in the crown of the kiln adjacent the outlet end, I have provided a chamber 9 which extends longitudinally along such crown and which is fed with air under pressure by means of a pipe 10 leading from the blower fan 7. The branch pipe 11 which leads from the blower fan to the points 8 is also provided with a pipe 12 which extends vertically outside of the wall of the tunnel kiln before the firing zone is reached. At a point above the kiln it is offset and then continues along and above the kiln to the chambers which feed both the oxidation zone and the water-smoking zone with fresh air.

Immediately above the oxidation zone which is located just in advance of the firing zone, I have provided a chamber 13 which likewise extends longitudinally along in the crown of the kiln and which is fed with air under pressure by means of a branch pipe 14.

Immediately adjacent the chamber extending along and within the crown of the kiln above the oxidation zone I have provided an additional chamber 15 which is entirely independent of the chamber 13 but which is likewise fed with air under pressure from the downwardly turned end 16 of the branch pipe 12.

The air put into the chamber 13 under pressure through the branch pipe 14 passes for a considerable distance along this chamber and then passes downwardly into any one of several series of inlets 17 into the oxidation zone. By the time this air reaches the oxidation zone, it is sufficiently heated and since it was taken from the atmosphere by the blower fan 7 it is amply pure. It furnishes sufficient oxygen for the oxidation of the ware and then passes to the draft ports 18, the collecting flues 19, the transverse draft passage 20 and the draft fan 21. The kiln is provided with a plurality of the inlets 17 and any one or more of these series may be utilized and the others blocked off depending upon the operating conditions required.

The air carried by the pipe 16 is delivered to the innermost end of the chamber 15 and then passes substantially throughout the length of such chamber to a series of ports 22 in the crown of the tunnel and thence into the water-smoking zone. Thus the air taken from the atmosphere by the blower fan is subjected to heating without contamination by the sulphur gases from the firing zone and is then injected directly into the water smoking zone.

Another important feature of my kiln has to do with the provision of a means whereby, after vitrification, the ware may be suddenly cooled from a high range of temperature to approximately 450 or 500 degrees C. This I accomplish by means of either vertical series of ports 23, illustrated best in Figure 4, or series of horizontal ports 24 or by both. These ports are disposed immediately beyond the vitrification zone and valve structures are provided so that fresh air may be introduced through either the vertical series of ports or through the horizontal series of ports or through both. The result is that the highly heated ware is suddenly reduced to approximately 500 degrees C., after which the cooling and annealing may progress more slowly. It is a recognized fact that in the treatment of clay ware the cooling of the ware through the higher ranges of temperature may be effected much more rapidly than is the case in the ranges below 450 or 500 C.

I have further provided a novel form of means for ensuring that the ware as it reaches the oxidation zone will be at such a temperature that a proper oxidation thereof will occur at a rapid rate. Realizing that there is an ideal temperature at which oxidation will occur most satisfactorily, I have introduced a furnace 25 in between the entrance end of the kiln and the oxidation zone and I utilize such furnace to heat the ware on its way to the oxidation zone so that when it reaches such zone it will be at a substantially ideal temperature for oxidation. I may use one or more furnace units and the temperature may vary with different classes of ware but the important fact is that I am thus enabled to have a positive and independent control of the temperature of the ware passing to the oxidation zone and am thereby enabled to bring about oxidation in a minimum length of time.

From the above description it will be obvious that I have provided a tunnel kiln wherein it is possible to approach the ideal mixture of gas and air in the vitrification zone. It will furthermore be apparent that, inasmuch as air in a heated condition is introduced from the atmosphere separately to both the oxidation and water-smoking zones, the amount of excess air in the vitrification zone may be reduced as nearly as possible to the ideal minimum. Furthermore, the introduction of fresh heated air to the oxidation zone ensures a proper oxidizing of the products and the introduction of fresh heated air to the water-smoking zone practically eliminates all danger of "scumming" of the ware. Still further, it will be evident that I am able to either greatly shorten the time or length of kiln required for annealing or greatly increase the effectiveness of the annealing action by means of the provision for suddenly causing a drop in temperature through the higher ranges of temperature. It will be obvious that I have produced a kiln whose efficiency and economy of operation is an advance over anything in the art.

I claim—

1. The method of firing clay ware in a tunnel kiln which comprises introducing fresh air to the oxidation zone independently of the products of combustion from the furnaces.

2. The method of firing clay ware in a tunnel kiln which comprises introducing preheated air to the oxidation zone independently of the products of combustion from the furnaces.

3. The method of firing clay ware in a tunnel kiln which comprises passing air along and in contact with the crown of the kiln to effect its heating and then delivering it into the oxidation zone independently of the products of combustion.

4. The method of firing clay ware in a tunnel kiln which comprises introducing to the oxidation zone fresh air in addition to the air contained in the products of combustion from the furnaces.

5. The method of firing clay ware in a tunnel kiln which comprises heating the ware independently of the combustion gases from the virtification zone before such ware reaches the oxidation zone, such heating being sufficient to ensure that the ware will be at the temperature at which oxidation will most readily occur.

6. The method of firing clay ware in a tunnel kiln which comprises diverting the products of combustion before they reach the water-smoking zone and introducing fresh air to effect water-smoking.

7. The method of firing clay ware in a tunnel kiln which comprises diverting the products of combustion before they reach the water-smoking zone and introducing fresh preheated air to the water-smoking zone to effect water smoking.

8. The method of firing clay ware in a tunnel kiln which comprises passing air along and in contact with the crown of the kiln and then introducing it to the water-smoking zone, independently of the products of combustion.

9. The method of firing clay ware in a tunnel kiln, which comprises introducing relatively cool air to the ware after it has passed the virtification zone and at a point near such zone and to such an extent as to effect a rapid cooling of the ware through the higher ranges of temperature.

10. A tunnel kiln comprising a chamber extending along the top of the kiln, means for feeding air into said chamber at one end and delivering it in contact with the ware in the kiln at the other end, said latter end being immediately above the oxidation zone, independently of the products of combustion.

11. A tunnel kiln comprising a chamber in the crown of such kiln and extending from adjacent the vitrification zone to the point where oxidation is initiated, means for delivering air to said chamber adjacent the vitrification zone and means for delivering such air in contact with the ware in the kiln at the oxidation zone after it has been preheated by passing through said chamber.

12. A tunnel kiln comprising a chamber in its crown leading from a point adjacent the oxidation zone to the water-smoking zone, means for introducing air to said chamber at a point adjacent the oxidation zone, and means for delivering air after passage through said chamber and in a preheated state to the water-smoking zone.

13. A tunnel kiln comprising means for supplying an oxidizing medium to the oxidation zone independently of the gases from the vitrification zone.

14. A tunnel kiln comprising means for diverting the products of combustion from the furnaces before they reach the water-smoking zone, and means for introducing fresh air to the ware in the water-smoking zone.

15. A tunnel kiln comprising means for diverting the products of combustion from the furnaces before they reach the water-smoking zone, and means for introducing fresh preheated air to the water-smoking zone.

16. A tunnel kiln comprising a means for introducing relatively cool air to the ware in substantial volume immediately after leaving the vitrification zone to effect rapid cooling of the ware through the higher ranges of temperature.

17. A tunnel kiln comprising a plurality of air ports shortly beyond the vitrification zone, and means for opening said ports to effect the introduction of air to the ware to induce rapid cooling of the ware through the higher ranges of temperature.

In testimony whereof I hereby affix my signature.

CARL B. HARROP.